United States Patent
Koyo et al.

(10) Patent No.: US 10,329,430 B2
(45) Date of Patent: Jun. 25, 2019

(54) LOW-REFLECTION COATED GLASS SHEET, METHOD FOR PRODUCING LOW-REFLECTION COATED SUBSTRATE, AND COATING LIQUID FOR FORMING LOW-REFLECTION COATING OF LOW-REFLECTION COATED SUBSTRATE

(71) Applicant: Nippon Sheet Glass Company, Limited, Tokyo (JP)

(72) Inventors: Mizuho Koyo, Hyogo (JP); Mitsuhiro Kawazu, Hyogo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 175 days.

(21) Appl. No.: 15/546,922

(22) PCT Filed: Jan. 28, 2016

(86) PCT No.: PCT/JP2016/000450
§ 371 (c)(1),
(2) Date: Jul. 27, 2017

(87) PCT Pub. No.: WO2016/121404
PCT Pub. Date: Aug. 4, 2016

(65) Prior Publication Data
US 2018/0022930 A1 Jan. 25, 2018

(30) Foreign Application Priority Data
Jan. 29, 2015 (JP) .................................. 2015-015285

(51) Int. Cl.
*B32B 17/06* (2006.01)
*B32B 15/04* (2006.01)
(Continued)

(52) U.S. Cl.
CPC ............ *C09D 5/006* (2013.01); *C03C 17/007* (2013.01); *C03C 17/25* (2013.01); *C03C 17/256* (2013.01);
(Continued)

(58) Field of Classification Search
USPC .................................. 428/426, 428, 432, 688
See application file for complete search history.

(56) References Cited

U.S. PATENT DOCUMENTS 6,103,363 A * 8/2000 Boire .................... C03C 17/002
428/325
6,251,523 B1 * 6/2001 Takahashi ......... B32B 17/10036
428/428

(Continued)

FOREIGN PATENT DOCUMENTS

JP 2012148950 A 8/2012
JP 2013537873 A 10/2013
(Continued)

OTHER PUBLICATIONS

International Search Report for PCT/JP2016/000450, dated Apr. 26, 2016, 5 pages including translation.

*Primary Examiner* — Lauren R Colgan
(74) *Attorney, Agent, or Firm* — Hamre, Schumann, Mueller & Larson, P.C.

(57) ABSTRACT

A low-reflection coated glass sheet of the present invention includes a glass sheet and a low-reflection coating. The low-reflection coating is formed on at least a portion of one principal surface of the glass sheet, and contains a binder containing silica as a main component, fine silica particles bound by the binder, and fine titania particles bound by the binder. For the low-reflection coated glass sheet, a transmittance gain is 1.7% or more. The low-reflection coating contains 25 mass % to 43 mass % of the silica which is the main component of the binder, 40 mass % to 64 mass % of (Continued)

the fine silica particles, and 10 mass % to 20 mass % of the fine titania particles, based on the total mass of the low-reflection coating. As such, the low-reflection coated glass sheet of the present invention has high abrasion resistance and is capable of exhibiting photocatalytic properties and hydrophilicity when irradiated with light.

11 Claims, 1 Drawing Sheet

(51) Int. Cl.
    *C09D 5/00*           (2006.01)
    *C09D 7/40*           (2018.01)
    *C03C 17/25*         (2006.01)
    *C09D 1/00*           (2006.01)
    *C03C 17/00*         (2006.01)

(52) U.S. Cl.
    CPC ................ *C09D 1/00* (2013.01); *C09D 5/00* (2013.01); *C09D 7/40* (2018.01); *C09D 7/70* (2018.01); *C03C 2217/732* (2013.01); *C03C 2218/118* (2013.01)

(56) References Cited

U.S. PATENT DOCUMENTS

| | | | |
|---|---|---|---|
| 6,387,844 B1* | 5/2002 | Fujishima | A61L 9/205 427/164 |
| 2002/0014090 A1* | 2/2002 | Tsujino | C03C 1/008 65/17.2 |
| 2007/0116966 A1* | 5/2007 | Mellott | C03C 17/3417 428/432 |
| 2011/0135941 A1 | 6/2011 | Otani et al. | |
| 2012/0148832 A1* | 6/2012 | Yabuta | B01J 21/063 428/331 |
| 2012/0244318 A1* | 9/2012 | Koyo | G02B 1/113 428/149 |
| 2013/0163087 A1* | 6/2013 | Lecolley | C03C 17/007 359/601 |
| 2015/0004398 A1* | 1/2015 | Yabuta | C03C 17/23 428/328 |
| 2015/0177425 A1* | 6/2015 | Kondo | G02B 5/0226 428/149 |
| 2015/0355381 A1* | 12/2015 | Yabuta | C03C 17/25 359/601 |

FOREIGN PATENT DOCUMENTS

| | | |
|---|---|---|
| JP | 2014015543 A | 1/2014 |
| JP | 2014032248 A | 2/2014 |
| WO | 0142156 A1 | 6/2001 |
| WO | 2010018852 A1 | 2/2010 |
| WO | 2011021383 A1 | 2/2011 |
| WO | 2014119267 A1 | 8/2014 |

* cited by examiner

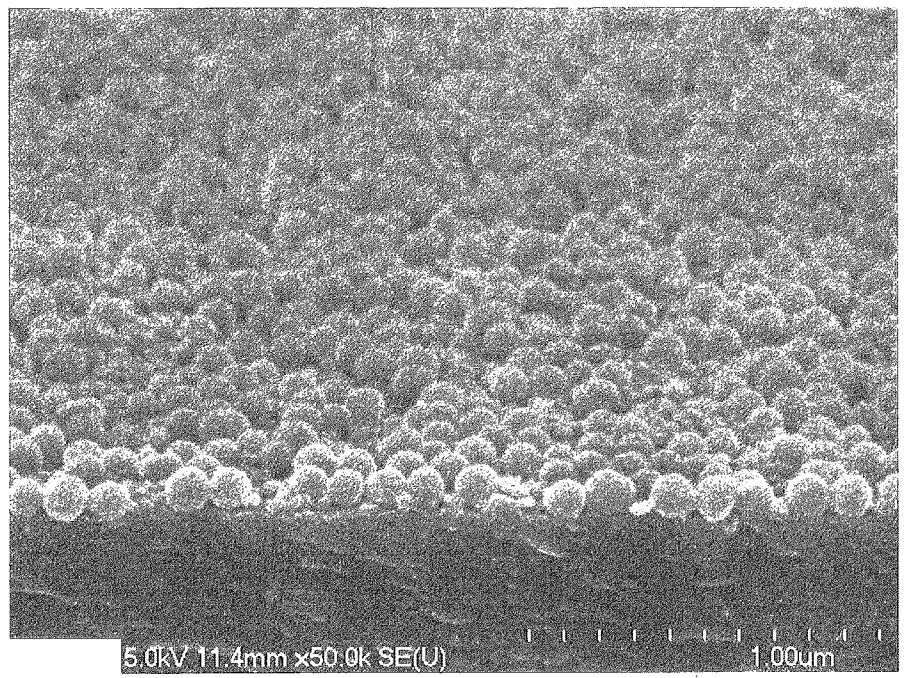

LOW-REFLECTION COATED GLASS SHEET, METHOD FOR PRODUCING LOW-REFLECTION COATED SUBSTRATE, AND COATING LIQUID FOR FORMING LOW-REFLECTION COATING OF LOW-REFLECTION COATED SUBSTRATE

TECHNICAL FIELD

The present invention relates to a low-reflection coated glass sheet, a method for producing a low-reflection coated substrate, and a coating liquid for forming a low-reflection coating of a low-reflection coated substrate.

BACKGROUND ART

It is conventional practice to form a low-reflection coating on a glass sheet for the purpose of improving the function of the glass sheet, such as increasing the amount of light to be transmitted through the glass sheet or enabling prevention of glare. A low-reflection coated glass sheet including a glass sheet and a low-reflection coating formed on the glass sheet is used, for example, in a photoelectric conversion device such as a thin-film solar cell. In this case, placing the low-reflection coating on the sunlight-incident side of the low-reflection coated glass sheet allows more sunlight to be introduced to the photoelectric conversion layer or solar cell element of the photoelectric conversion device. This can result in an increase in the electricity generated by the photoelectric conversion device.

For example, Patent Literature 1 describes a cover glass for photoelectric conversion devices that has a reflection-reducing film. This cover glass having the reflection-reducing film is produced by applying a coating liquid containing fine silica particles and a compound as a binder source to a glass sheet having certain surface asperities by spraying, followed by drying and sintering. The average light transmittance of this cover glass in the wavelength range of 380 nm to 1100 nm can be increased by 2.37% or more, compared to that of a glass sheet having no reflection-reducing film.

Patent Literature 2 describes a glass substrate including a glass sheet and a porous anti-reflection layer formed on the glass sheet. This glass substrate is produced by depositing a blend for priming on one surface of an ultra-transparent glass sheet by dip coating, then drying the blend on the glass sheet to obtain a substrate, then depositing another mixture on the substrate by dip coating, and finally subjecting the substrate to a predetermined heat treatment. The blend for priming is prepared by adding tetraethoxysilane (TEOS) and zirconium acetylacetonate to a predetermined solution. The other mixture is prepared by adding tetraethoxysilane (TEOS), aluminum acetylacetonate, and colloidal silica to a predetermined solution. This glass substrate has been observed to exhibit an increase of 2.2% to 2.6% in light transmittance in the wavelength range of 300 nm to 1100 nm.

Patent Literature 3 describes a coating composition prepared by using a PGME-dispersed silica sol and a binder solution. The PGME-dispersed silica sol is one prepared by adding propylene glycol monomethyl ether (PGME) to a dispersion of silica, and the binder solution is one prepared by mixing tetraethoxysilane and aluminum nitrate nonahydrate. An aqueous dispersion of colloidal silica having a dispersed particle diameter greater than an average primary particle diameter is used in the PGME-dispersed silica sol. A coating obtained by using this coating composition has a refractive index of 1.2656 to 1.2960 at a wavelength of 633 nm.

CITATION LIST

Patent Literature

Patent Literature 1: JP 2014-032248 A
Patent Literature 2: JP 2013-537873 A
Patent Literature 3: JP 2014-015543 A

SUMMARY OF INVENTION

Technical Problem

Properties called "reflectance loss" and "transmittance gain" are important for low-reflection coated glass sheets. The term "reflectance loss" is used, in relation to average light reflectance in a predetermined wavelength range, to refer to a decrease in the average reflectance produced by formation of a low-reflection coating. Specifically, the reflectance loss is determined by subtracting an average light reflectance of a glass sheet provided with a low-reflection coating in a predetermined wavelength range from an average light reflectance of the glass sheet unprovided with the low-reflection coating in the predetermined wavelength range. The term "transmittance gain" is used, in relation to average light transmittance in a predetermined wavelength range, to refer to an increase in the average transmittance produced by formation of a low-reflection coating. Specifically, the transmittance gain is determined by subtracting an average light transmittance of a glass sheet unprovided with a low-reflection coating in a predetermined wavelength range from an average light transmittance of the glass sheet provided with the low-reflection coating in the predetermined wavelength range.

A low-reflection coating of a low-reflection coated glass sheet may scrape against foreign matters such as sand dust, depending on the environment where the low-reflection coated glass sheet is used. It is therefore desirable for the low-reflection coated glass sheet to have high abrasion resistance. In addition, an organic matter may adhere to the low-reflection coating of the low-reflection coated glass sheet. To decompose the organic matter adhering to the low-reflection coating and decrease the adhesion of the organic matter so as to allow the organic matter to be washed away by washing water such as rain water, it is desirable for the low-reflection coating to have photocatalytic properties and be capable of exhibiting hydrophilicity when irradiated with light. Patent Literatures 1 to 3 give no particular discussion of the abrasion resistance, photocatalytic properties, and hydrophilicity of low-reflection coated glass sheets. The present invention aims to provide a low-reflection coated glass sheet having high abrasion resistance and capable of exhibiting photocatalytic properties and hydrophilicity when irradiated with light.

Solution to Problem

The present invention provides a low-reflection coated glass sheet including:
a glass sheet; and
a low-reflection coating formed on at least a portion of one principal surface of the glass sheet, the low-reflection coating containing a binder containing silica as a main component, fine silica particles bound by the binder, and fine titania particles bound by the binder, wherein a transmittance gain is 1.7% or more and preferably 2.0% or more, the transmittance gain being determined by subtracting an average light transmittance of the glass sheet unprovided with the low-reflection coating in the wavelength of 380 nm to 850 nm from an average light transmittance of the low-reflection coated glass sheet in the wavelength range of 380 nm to 850 nm, and the low-reflection coating contains 25 mass % to 43 mass % of the silica of the binder, 40 mass % to 64 mass % of the fine silica particles, and 10 mass % to 20 mass % of the fine titania particles, based on the total mass of the low-reflection coating.

The present invention also provides a method for producing a low-reflection coated substrate, wherein the low-reflection coated substrate includes: a substrate; and a low-reflection coating formed on at least a portion of one principal surface of the substrate, the low-reflection coating containing a binder containing silica as a main component, fine silica particles bound by the binder, and fine titania particles bound by the binder, a transmittance gain is 1.7% or more, the transmittance gain being determined by subtracting an average light transmittance of the substrate unprovided with the low-reflection coating in the wavelength of 380 nm to 850 nm from an average light transmittance of the low-reflection coated substrate in the wavelength range of 380 nm to 850 nm, and the low-reflection coating contains 25 mass % to 43 mass % of the silica of the binder, 40 mass % to 64 mass % of the fine silica particles, and 10 mass % to 20 mass % of the fine titania particles, based on the total mass of the low-reflection coating, the method including: forming a coating film by applying a coating liquid to the substrate; and forming the low-reflection coating by drying and curing the coating film, wherein a surface of the substrate has a maximum temperature of 120° C. or higher and 350° C. or lower in the drying and curing of the coating film.

The present invention further provides a coating liquid for forming a low-reflection coating of a low-reflection coated substrate, wherein the low-reflection coating is formed on at least a portion of one principal surface of a substrate and contains a binder containing silica as a main component, fine silica particles bound by the binder, and fine titania particles bound by the binder, a transmittance gain is 1.7% or more, the transmittance gain being determined by subtracting an average light transmittance of the substrate unprovided with the low-reflection coating in the wavelength of 380 nm to 850 nm from an average light transmittance of the low-reflection coated substrate in the wavelength range of 380 nm to 850 nm, and the low-reflection coating contains 25 mass % to 43 mass % of the silica of the binder, 40 mass % to 64 mass % of the fine silica particles, and 10 mass % to 20 mass % of the fine titania particles, based on the total mass of the low-reflection coating, the coating liquid including fine silica particles, fine titania particles, a starting material of the binder, and a solvent, the starting material of the binder including a silicon alkoxide, the solvent including an organic solvent as a main component, the organic solvent being miscible with water and having a boiling point of 150° C. or lower.

Advantageous Effects of Invention

The low-reflection coated glass sheet of the present invention has high abrasion resistance and is capable of exhibiting photocatalytic properties and hydrophilicity when irradiated with light.

BRIEF DESCRIPTION OF DRAWING

FIG. 1 is a field emission scanning electron microscope (FE-SEM) photograph of a low-reflection coated glass sheet according to Example 2.

DESCRIPTION OF EMBODIMENTS

A low-reflection coated glass sheet according to the present invention includes a glass sheet and a low-reflection coating. The low-reflection coating contains a binder containing silica as a main component, fine silica particles bound by the binder, and fine titania particles bound by the binder. The low-reflection coating is formed on at least a portion of one principal surface of the glass sheet. A transmittance gain is 1.7% or more and preferably 2.0% or more, the transmittance gain being determined by subtracting an average light transmittance of the glass sheet unprovided with the low-reflection coating in the wavelength range of 380 nm to 850 nm from an average light transmittance of the low-reflection coated glass sheet in the wavelength range of 380 nm to 850 nm. The low-reflection coating contains 25 mass % to 43 mass % of the silica of the binder, 40 mass % to 64 mass % of the fine silica particles, and 10 mass % to 20 mass % of the fine titania particles, based on the total mass of the low-reflection coating. As such, the low-reflection coated glass sheet has high abrasion resistance and is capable of exhibiting photocatalytic properties and hydrophilicity when irradiated with light. In particular, when the content of the silica of the binder is as described above, a reflectance loss determined after the low-reflection coated glass sheet is subjected to a reciprocating abrasion test described below is significantly increased. To achieve good photocatalytic properties, high hydrophilicity, and high abrasion resistance, it is desirable for the low-reflection coating to contain 28 mass % to 30 mass % of the silica of the binder and 48 mass % to 58 mass % of the fine silica particles, based on the total mass of the low-reflection coating. The "main component" as described herein refers to a component whose content is highest on a mass basis. The "fine particles" as described herein refer to particles having an average particle diameter of less than 1 μm. The "average particle diameter" as described herein is determined by observing a cross-section of the low-reflection coating with a scanning electron microscope (SEM). Specifically, 50 particles the entirety of each of which is observable are randomly selected, the largest and smallest diameters of each particle are measured, the average of the largest and smallest diameters is determined as the particle diameter of the particle, and the average of the particle diameters of the 50 particles is determined as the "average particle diameter".

In order for the binder to bind the fine silica particles and the fine titania particles so firmly as to improve the abrasion resistance of the low-reflection coated glass sheet, the content of the silica of the binder is, for example, 25 mass % or more, desirably 26 mass % or more, and more desirably 28 mass % or more, based on the total mass of the low-reflection coating. In order for the content of the fine silica particles and the content of the fine titania particles to be equal to or higher than predetermined values, the content of the silica of the binder is, for example, 43 mass % or less, preferably 33 mass % or less, and more preferably 30 mass % or less, based on the total mass of the low-reflection coating. The binder may contain, for example, an aluminum compound in addition to the silica. When the low-reflection coating contains an aluminum compound, the aluminum compound is preferably derived from a water-soluble inorganic aluminum compound added to a coating liquid for forming the low-reflection coating, and is more preferably derived from an aluminum halide, aluminum nitrate, or aluminum phosphate. In this case, the aluminum halide is preferably aluminum chloride. In the low-reflection coating, the content of the aluminum compound calculated as $Al_2O_3$ is, for example, 2 to 7 mass % and preferably 4 to 7 mass %. When the aluminum compound is contained in the low-reflection coating in an amount corresponding to the above content, the low-reflection coating has increased chemical resistance. If the content of the aluminum compound is less than 2 mass %, the chemical resistance of the low-reflection coating will decrease. If the content of the aluminum compound is more than 7 mass %, the transmittance gain produced by the low-reflection coating will decrease.

The low-reflection coating of the low-reflection coated glass sheet according to the present invention may further contain another additive. Examples of the other additive include a titanium compound, a zirconium compound, a zinc compound, and a niobium compound. The incorporation of such an additive can produce, for example, an increase in chemical resistance, such as alkali resistance, of the low-reflection coating. In addition, the low-reflection coating may contain, for example, 0.1 to 5 mass % of a phosphorus compound calculated as $P_2O_5$.

Hydrolyzable silicon compounds such as silicon alkoxides can be used as a source of the silica of the binder. Examples of the silicon alkoxides that can be used include tetramethoxysilane, tetraethoxysilane, and tetraisopropoxysilane. Other examples of silicon alkoxides that can be used include trifunctional or difunctional silicon alkoxides such as methyltrimethoxysilane, methyltriethoxysilane, dimethyldiethoxysilane, diethyldiethoxysilane, phenyltriethoxysilane, glycidoxyalkyltrialkoxysilanes (such as 3-glycidoxypropyltrimethoxysilane), other epoxy silanes, acrylsilanes, methacrylsilanes, and aminosilanes. The silica of the binder is formed by a sol-gel process in which any of these hydrolyzable silicon compounds undergoes hydrolysis and polycondensation.

The low-reflection coating reduces light reflection, due to containing the fine silica particles. In order for the low-reflection coated glass sheet to yield a high transmittance gain, it is desirable that gaps of appropriate size be formed between the adjacent fine silica particles. From this viewpoint, the content of the fine silica particles is, for example, 64 mass % or less and desirably 58 mass % or less, based on the total mass of the low-reflection coating. To reduce light reflection satisfactorily, the content of the fine silica particles is, for example, 40 mass % or more, desirably 47 mass % or more, more desirably 48 mass % or more, and even more desirably 53 mass % or more, based on the total mass of the low-reflection coating.

The fine silica particles contained in the low-reflection coating are solid and substantially spherical. When a fine particle is described to be "substantially spherical", this means that the ratio of the largest diameter to the smallest diameter (largest diameter/smallest diameter) of the fine particle as observed with a SEM is 1.5 or less. In the low-reflection coating, for example, the fine silica particles may be entirely buried in the binder. It is desirable, however, that the fine silica particles contained in the low-reflection coating have at least a portion exposed outside the binder, rather than being entirely buried in the binder. In order for the fine silica particles to be bound so firmly by the binder in the low-reflection coating as to improve the abrasion resistance of the low-reflection coated glass sheet, the average particle diameter of the fine silica particles is desirably 600 nm or less, more desirably 500 nm or less, and even more desirably 150 nm or less. To prevent the fine silica particles from aggregating in the low-reflection coating, the average particle diameter of the fine silica particles is desirably 30 nm or more and more desirably 70 nm or more.

By virtue of the fine titania particles being contained in the low-reflection coating, the low-reflection coated glass sheet is capable of exhibiting photocatalytic properties and hydrophilicity when irradiated with light. In addition, the abrasion resistance of the low-reflection coated glass sheet is improved; that is, in particular, the reflectance loss after reciprocating abrasion test is increased. Given that titania has a higher refractive index than silica, the incorporation of the fine titania particles may seem to cause a decrease in the reflection-reducing performance of the low-reflection coating (a decrease in the reflectance loss before reciprocating abrasion test). In fact, however, when a predetermined amount of the fine titania particles are contained in the low-reflection coating, the reflectance loss before reciprocating abrasion test is also increased. From these viewpoints, the content of the fine titania particles is, for example, 10 mass % to 20 mass % based on the total mass of the low-reflection coating.

The fine titania particles contained in the low-reflection coating are solid and substantially spherical. The incorporation of the fine titania particles in the low-reflection coating imparts photocatalytic properties to the low-reflection coating. In addition, due to containing the fine titania particles, the low-reflection coating exhibits a hydrophilic effect when irradiated with light having a predetermined wavelength (400 nm or less, for example). The average particle diameter of the fine silica particles is desirably five or more times the average particle diameter of the fine titania particles. In this case, the fine titania particles can sufficiently enter the spaces defined by the surfaces of the adjacent fine silica particles and the one principal surface of the glass sheet. Additionally, in this case, the low-reflection coated glass sheet is likely to maintain its ability to exhibit photocatalytic properties and hydrophilicity upon light irradiation, and also likely to have high abrasion resistance. In order for the fine titania particles to more easily enter that region of the low-reflection coating which is in contact with the one principal surface of the glass sheet, the average particle diameter of the fine titania particles is, for example, 50 nm or less, desirably 30 nm or less, and more desirably 20 nm or less. In order for the fine titania particles to be uniformly dispersed in a coating liquid for forming the low-reflection coating, the average particle diameter of the fine titania particles is, for example, 3 nm or more or more and desirably 5 nm or more.

For the low-reflection coated glass sheet according to the present invention, for example, the reflectance loss after reciprocating abrasion test is 1.0% or more. That is, the low-reflection coated glass sheet according to the present invention yields a large reflectance loss after being subjected to a reciprocating abrasion test. Thus, the low-reflection coated glass sheet is suitable, for example, for use as a glass sheet for a photoelectric conversion device which may be used in an environment where a large amount of foreign matters such as sand dust are present. The reflectance loss after reciprocating abrasion test can be determined by subtracting an average light reflectance of the low-reflection coated glass sheet in the wavelength range of 360 nm to 740 nm from an average light reflectance of the glass sheet unprovided with the low-reflection coating in the wavelength range of 360 nm to 740 nm, the average light reflectance of the low-reflection coated glass sheet being determined after the low-reflection coated glass sheet is subjected to a reciprocating abrasion test performed by moving an abrasive, CS-10F, in contact with the low-reflection coating at a load of 4 N with 50 cycles of reciprocation. The abrasive, CS-10F, is an abrasive pad manufactured by Taber Industries. For the low-reflection coated glass sheet according to the present invention, the reflectance loss after reciprocating abrasion test is desirably 1.3% or more. For the low-reflection coated glass sheet according to the present invention, the reflectance loss after reciprocating abrasion test is more desirably 1.5% or more.

For the low-reflection coated glass sheet according to the present invention, a contact angle of a water droplet on the low-reflection coating is, for example, 5° or less and desirably 3.5° or less, the contact angle being determined after the low-reflection coating is irradiated with ultraviolet light having a wavelength of 352 nm and an energy density of 1 mW/cm$^2$ for 24 hours. This means that the low-reflection coated glass sheet exhibits satisfactory hydrophilicity when irradiated with light. As such, an organic matter which has adhered to the low-reflection coating and whose adhesion has been decreased by the photocatalytic properties of the low-reflection coating can easily be removed from the low-reflection coated glass sheet by washing water such as rain water.

As previously described, the low-reflection coating is formed on at least a portion of one principal surface of the glass sheet. The morphology of the one principal surface of the glass sheet is not particularly limited. For example, the arithmetic average roughness Ra of the glass sheet is 1 nm or less, and desirably 0.5 nm or less. The arithmetic average roughness Ra as described herein corresponds to that as specified in JIS (Japanese Industrial Standards) B 0601-1994.

Alternatively, the glass sheet may be figured glass having one principal surface with asperities. The mean spacing Sm of the asperities is 0.3 mm or more and 2.5 mm or less, desirably 0.3 mm or more, more desirably 0.4 mm or more, and particularly desirably 0.45 mm or more. The mean spacing Sm is desirably 2.5 mm or less, more desirably 2.1 mm or less, even more desirably 2.0 mm or less, and particularly desirably 1.5 mm or less. The mean spacing Sm as described herein refers to an average of lengths of peak-valley periods in a roughness profile which are determined based on points at which the roughness profile intersects the mean line. It is further desirable that the surface asperities of the figured glass sheet have a maximum height Ry of 0.5 μm to 10 μm, particularly 1 μm to 8 μm, as well as having a mean spacing Sm within the above range. The mean spacing Sm and the maximum height Ry as described herein correspond to those as specified in JIS B 0601-1994. It is desirable that the surface asperities of the glass sheet in the form of figured glass have an arithmetic average roughness Ra of 0.3 μm to 5.0 μm, particularly 0.4 μm to 2.0 μm, more particularly 0.5 μm to 1.2 μm, as well as having a mean spacing Sm and a maximum height Ry within the above ranges. The figured glass as described above exhibits a sufficient anti-glare effect attributed to its surface asperities; however, when the roughness of the surface is significantly large, reflected color is likely to become uneven in the surface. The glass sheet is desirably as free of coloring components as possible, although the composition of the glass sheet is not particularly limited. For example, the content of iron oxide, which is a typical coloring component, in the glass sheet is desirably 0.06 mass % or less and more desirably 0.02 mass % or less when calculated as $Fe_2O_3$ content.

The low-reflection coated glass sheet may further include a transparent electrode film formed on that principal surface of the glass sheet which is opposite to the principal surface on which the low-reflection coating is to be formed. In this case, for example, one or more underlayers and a transparent electrode layer containing fluorine-doped tin oxide as a main component are stacked in order on the principal surface of the glass sheet opposite to the principal surface on which the low-reflection coating is to be formed.

The thickness of the low-reflection coating is, for example, but not limited to, 80 nm to 500 nm, desirably 100 nm to 300 nm, and more desirably 100 nm to 180 nm.

Next, an example of the method for producing the low-reflection coated glass sheet according to the present invention will be described. The low-reflection coated glass sheet can be produced by applying a coating liquid for forming the low-reflection coating to at least a portion of one principal surface of the glass sheet and then drying and curing the applied coating liquid.

The coating liquid is a liquid containing a binder source, fine silica particles, and fine titania particles. The binder source is prepared, for example, by adding a hydrolysis catalyst and a hydrolyzable silicon compound such as a silicon alkoxide sequentially to a predetermined solvent under stirring. The hydrolysis of the hydrolyzable silicon compound can be carried out in any appropriate manner. It is desirable that the hydrolysis of the hydrolyzable silicon compound be carried out in a solution containing fine silica particles, because this promotes a polycondensation reaction between silanol groups present on the surfaces of the fine silica particles and silanol groups formed by hydrolysis of the hydrolyzable silicon compound, thus leading to an increase in the proportion of the silica that contributes to binding between the fine silica particles in the binder. Specifically, the coating liquid is prepared, for example, by adding a hydrolysis catalyst and a hydrolyzable silicon compound such as a silicon alkoxide sequentially to a dispersion of fine silica particles under stirring. The fine titania particles can be added at any time during the preparation of the coating liquid. The coating liquid is prepared, for example, by adding a hydrolysis catalyst and a hydrolyzable silicon compound such as a silicon alkoxide sequentially to a mixture of a dispersion of fine silica particles and a dispersion of fine titania particles under stirring. For example, when the low-reflection coating is to contain an aluminum compound, aluminum nitrate or an aluminum halide such as aluminum chloride is added as a precursor of the aluminum compound to the coating liquid. Either an acid or a base can be used as the hydrolysis catalyst. It is desirable to use an acid, particularly an inorganic acid, more particularly hydrochloric acid, in terms of the stability of the coating liquid. It is desirable to use as the hydrolysis catalyst an acid having a high degree of electrolytic dissociation in an aqueous solution. Specifically, it is desirable to use an acid having an acid dissociation constant pKa (which refers to the first acid dissociation constant when the acid is a polybasic acid) of 2.5 or less. Examples of acids desired as the hydrolysis catalyst include: (i) volatile inorganic acids such as hydrochloric acid and nitric acid; (ii) organic acids such as trifluoroacetic acid, methanesulfonic acid, benzenesulfonic acid, and p-toluenesulfonic acid; (iii) polybasic acids such as maleic acid, phosphoric acid, and oxalic acid; (iv) sulfuric acid; and (v) sulfamic acid. An acidic hydrolysis catalyst allows better dispersion of the fine silica particles and fine titania particles than a basic hydrolysis catalyst. Furthermore, chlorine ions derived from hydrochloric acid enhance the effect provided by incorporation of an aluminum compound in the low-reflection coating (high chemical resistance of the low-reflection coating to salt spray).

The coating liquid contains a solvent. For example, the solvent contains, as a main component, an organic solvent miscible with water and having a boiling point of 150° C. or lower. The boiling point of the organic solvent contained as the main component of the solvent is, for example, 70° C. or higher.

Examples of the method available for applying the coating liquid to a principal surface of the glass sheet include, but are not limited to, spin coating, roll coating, bar coating, dip coating, and spray coating. In terms of the efficiency of mass production and the uniformity of the visual appearance of the coating, it is desirable to use roll coating or bar coating to apply the coating liquid to the principal surface of the glass sheet. In terms of the efficiency of mass production, the spray coating may be used to apply the coating liquid to the principal surface of the glass sheet.

The method for drying and curing the coating liquid applied to a principal surface of the glass sheet is not particularly limited. For example, hot air drying can be used to dry and cure the applied coating liquid. In this case, the temperature conditions to be imposed on the glass sheet are not particularly limited. For example, when the applied coating liquid is dried and cured by hot air drying, it is desirable that the principal surface of the glass sheet to which the coating liquid has been applied should have a maximum temperature of 200° C. or higher and 350° C. or lower, and that the duration during which the temperature of the principal surface of the glass sheet is 200° C. or higher should be 5 minutes or less. In this case, the abrasion resistance, in particular the reflectance loss after reciprocating abrasion test, of the low-reflection coated glass sheet is effectively increased. When the applied coating liquid is dried and cured by hot air drying, the maximum temperature of the principal surface of the glass sheet to which the coating liquid has been applied may be 120° C. or higher and 250° C. or lower, and the duration during which the temperature of the principal surface of the glass sheet is 120° C. or higher may be 3 minutes or less.

EXAMPLES

Hereinafter, the present invention will be described in more detail with reference to examples. The present invention is not limited to the examples given below. Methods for test or measurement conducted on low-reflection coated glass sheets according to Examples and Comparative Examples will first be described.

(Reciprocating Abrasion Test)

Low-reflection coated glass sheets according to Examples and Comparative Examples were subjected to a reciprocating abrasion test using a reciprocating abrasion tester manufactured by DAIEI KAGAKU SEIKI MFG. CO., LTD. Specifically, each low-reflection coated glass sheet was fixed by a jig, with the low-reflection coating facing upward. Next, a circular abrasive of 19 mm diameter, CS-10F, was brought into contact, at its circular face, with the low-reflection coating, and a load of 4 N was applied. The area of contact between the abrasive, CS-10F, and the low-reflection coating was 284 mm$^2$. In this state, the abrasive, CS-10F, was moved straight back and forth 50 times on the low-reflection coating. The velocity of the abrasive was set to 120 mm/sec., and the stroke width of the abrasive was set to 120 mm.

(Evaluation of Optical Properties)

For each of the low-reflection coated glass sheets according to Examples and Comparative Examples, the values of light reflectance in the wavelength range of 360 nm to 740 nm were measured using a spectrocolorimeter (CM-2600d manufactured by KONICA MINOLTA, INC.), and the values of light reflectance in this wavelength range were averaged to determine an average reflectance. The average reflectance determination was made before and after the reciprocating abrasion test for each of the low-reflection coated glass sheets according to Examples and Comparative Examples. The average reflectance determination was made in the same manner as above also for glass sheets used in the low-reflection coated glass sheets according to Examples and Comparative Examples before formation of low-reflection coatings. In each of Examples and Comparative Examples, a reflectance loss before reciprocating abrasion test was determined by subtracting the average reflectance of the low-reflection coated glass sheet not subjected to the reciprocating abrasion test from the average reflectance of the glass sheet unprovided with the low-reflection coating. In each of Examples and Comparative Examples, a reflectance loss after reciprocating abrasion test was determined by subtracting the average reflectance of the low-reflection coated glass sheet subjected to the reciprocating abrasion test from the average reflectance of the glass sheet unprovided with any low-reflection coating. In the reflectance measurement of the low-reflection coated glass sheets according to Examples and Comparative Examples, incident light having wavelengths ranging from 360 nm to 740 nm was applied to the low-reflection coatings. In the reflectance measurement of the glass sheets prior to formation of the low-reflection coatings, incident light having wavelengths ranging from 360 nm to 740 nm was applied to that principal surface of each glass sheet on which the low-reflection coating was to be formed. The results are shown in Table 1.

The transmittance spectrum of each of the low-reflection coated glass sheets according to Examples and Comparative Examples was measured using a spectrophotometer (UV-3100 PC manufactured by Shimadzu Corporation). The values of transmittance were averaged over the wavelength range of 380 nm to 850 nm in the transmittance spectrum to calculate an average transmittance. For the transmittance spectrum measurement, incident light was applied to the low-reflection coating of each of the low-reflection coated glass sheets according to Examples and Comparative Examples. In addition, for each of the glass sheets used in Examples and Comparative Examples, the measurement of transmittance spectrum and the calculation of average transmittance were performed in the absence of any low-reflection coating formed on the glass sheet. In each of Examples and Comparative Examples, a transmittance gain was calculated by subtracting the average transmittance of the glass sheet unprovided with any low-reflection coating from the average transmittance of the low-reflection coated glass sheet not subjected to the reciprocating abrasion test. The results are shown in Table 1.

(Evaluation of Photo-induced Hydrophilization)

The low-reflection coating of each of the low-reflection coated glass sheets according to Examples 1 and 3 to 8 and Comparative Example 1 was irradiated with ultraviolet light (having a dominant wavelength of 352 nm and an energy density of 1 mW/cm$^2$) for 24 hours using a black light. After that, a contact angle of a water droplet on the surface of the low-reflection coating was measured using a contact angle meter (manufactured by Kyowa Interface Science Co., Ltd. under the trade name "DropMaster 300"). The results are shown in Table 1. Prior to the ultraviolet irradiation, the surface of the low-reflection coating was wiped with a fabric impregnated with methanol.

(SEM Observation)

The low-reflection coatings of the low-reflection coated glass sheets according to Examples and Comparative Examples were observed with a field emission scanning electron microscope (S-4500 manufactured by Hitachi, Ltd.) which is abbreviated as "FE-SEM". The thickness of each low-reflection coating was measured at five points in a FE-SEM photograph, taken from above at an angle of 30°, of a cross-section of the low-reflection coating, and the average of the measured values was calculated as the average thickness of the low-reflection coating. The results are shown in Table 1. A FE-SEM photograph of the low-reflection coated glass sheet according to Example 2 is shown in FIG. 1.

Example 1

An amount of 28.1 parts by mass of a fine silica particle dispersion (manufactured by FUSO CHEMICAL CO., LTD. under the trade name "Quartron PL-7", containing fine silica particles with an average primary particle diameter of 125 nm, and having a solids concentration of 23 wt %), 58.6 parts by mass of 1-methoxy-2-propanol (solvent), and 1.0 part by mass of 1N hydrochloric acid (hydrolysis catalyst) were mixed by stirring, and 12.2 parts by mass of tetraethoxysilane (ethyl orthosilicate, manufactured by TAMA CHEMICALS CO., LTD. and used as a source of silica of the binder) was added to the mixture under continuous stirring. The stirring was continued for another 8 hours while maintaining a temperature of 40° C. to hydrolyze tetraethoxysilane, thus yielding a raw material liquid according to Example 1. An amount of 42.5 g of the raw material liquid, 2.0 g of propylene glycol (solvent), 53.0 g of 1-methoxy-2-propanol, and 2.5 g of a fine titania particle dispersion (an aqueous dispersion acidified with nitric acid; manufactured by ISHIHARA SANGYO KAISHA, LTD. under the trade name "Photocatalytic Titanium Dioxide, STS-01", having a solids concentration of 30 mass %, and containing fine titania particles with an average primary particle diameter of 7 nm) were mixed by stirring to obtain a coating liquid according to Example 1. The solids concentration of the total coating liquid according to Example 1 was 5 mass % when the mass of solids of the coating liquid was defined as the sum of the mass of tetraethoxysilane (source of silica of the binder) calculated as SiO$_2$, the mass of solids of the fine silica particle dispersion, the mass of solids of the fine titania particle dispersion, the mass of the optionally-added aluminum compound calculated as Al$_2$O$_3$, and the mass of the optionally-added additive calculated as metal oxide. It should be noted that neither aluminum compound nor any other additive was added to the coating liquid according to Example 1. The solids of the coating liquid according to Example 1 included 30 mass % of tetraethoxysilane calculated as SiO$_2$, 55 mass % of the fine silica particles, and 15 mass % of the fine titania particles.

A glass sheet with a transparent conductive film was prepared. This glass sheet was a 3.2-mm-thick glass sheet manufactured by Nippon Sheet Glass Co. Ltd. This glass sheet had a typical soda-lime-silicate composition and had a transparent conductive film formed by on-line CVD on one principal surface of the glass sheet, the transparent conductive film including a transparent conductive layer. As can be seen from the fact that this glass sheet had a transparent conductive film formed by on-line CVD, the glass sheet coated with the transparent conductive film was a glass sheet formed by a float process. The transparent conductive film lay on that principal surface of the glass sheet which was formed of glass that had not been in contact with a molten tin in a float bath (so-called "top surface). This glass sheet was cut into a 200 mm×300 mm piece, which was immersed in an alkaline solution (LBC-1, an alkaline cleaning liquid manufactured by LEYBOLD CO., LTD.) and then washed using an ultrasonic cleaner. The piece of glass sheet was rinsed with deionized water and then dried at ordinary temperature. A glass sheet for low-reflection coating formation was thus prepared. The coating liquid according to Example 1 was applied using a roll coater to the principal surface of the glass sheet opposite to the principal surface coated with the transparent conductive film. The application of the coating liquid was done in such a manner that the applied liquid formed a film having a thickness of 1 μm to 5 μm. Next, the coating liquid applied to the glass sheet was dried and cured using a belt conveyor-type hot air dryer. Specifically, the glass sheet was moved back and forth twice in the interior of the hot air dryer to pass the glass sheet under a hot air injection nozzle four times, with the temperature of hot air set to 300° C., the distance between the hot air injection nozzle and glass sheet set to 5 mm, and the conveyance speed set to 0.5 m/min. In this process, the duration during which the glass sheet coated with the coating liquid was in contact with hot air was 140 seconds, and the maximum temperature reached by the glass sheet's principal surface coated with the coating liquid was 199° C. After that, the glass sheet was left to cool to room temperature, and thus a low-reflection coated glass sheet according to Example 1 was obtained. It should be understood from the foregoing that in Example 1, the low-reflection coating was formed on the principal surface of the glass sheet which was formed of glass that had been in contact with a molten tin in a float bath (so-called bottom surface).

Examples 2 to 5

Coating liquids according to Examples 2 to 5 were prepared in the same manner as in Example 1, except for adjusting the amounts of the materials so that the content of tetraethoxysilane (source of silica of the binder) calculated as SiO$_2$, the content of the fine silica particles, and the content of the fine titania particles in solids of the coating liquids according to Examples 2 to 5 were as shown in Table 1. The solids concentration of each of the coating liquids according to Examples 2 to 5 was 5 mass %. In addition, low-reflection coated glass sheets according to Examples 2 to 5 were fabricated in the same manner as in Example 1, except for using the coating liquids according to Examples 2 to 5 instead of the coating liquid according to Example 1.

Example 6

An amount of 49.8 g of the raw material liquid according to Example 1, 46.8 g of 1-methoxy-2-propanol (solvent), and 3.4 g of the fine titania particle dispersion as used in Example 1 were mixed by stirring to obtain a coating liquid according to Example 6. The solids concentration of the coating liquid according to Example 6 was 6 mass %. As shown in Table 1, the content of tetraethoxysilane (source of silica of the binder) calculated as $SiO_2$, the content of the fine silica particles, and the content of the fine titania particles in solids of the coating liquid according to Example 6 were equal to those in Example 5. However, the solids concentration and the solvent of the coating liquid according to Example 6 were different from the solids concentration and the solvent of the coating liquid according to Example 5. A low-reflection coated glass sheet according to Example 6 was fabricated in the same manner as in Example 1, except for using the coating liquid according to Example 6 instead of the coating liquid according to Example 1.

Example 7

A coating liquid according to Example 7 was prepared in the same manner as in Example 6, except for adjusting the amounts of the materials so that the content of tetraethoxysilane (source of silica of the binder) calculated as $SiO_2$, the content of the fine silica particles, and the content of the fine titania particles in solids of the coating liquid were as shown in Table 1. The solids concentration of the coating liquid according to Example 7 was 6 mass %. A low-reflection coated glass sheet according to Example 7 was fabricated in the same manner as in Example 1, except for using the coating liquid according to Example 7 instead of the coating liquid according to Example 1.

Example 8

An amount of 28.8 parts by mass of the fine silica particle dispersion as used in Example 1, 54.5 parts by mass of 1-methoxy-2-propanol (solvent), and 5.0 parts by mass of an aqueous phosphoric acid solution (a 9.0 mass % aqueous solution prepared by dissolving phosphoric acid (manufactured by Tokyo Chemical Industry Co., Ltd. and having a concentration of 89.1 mass %) in deionized water) were mixed by stirring, and 11.7 parts by mass of tetraethoxysilane was added to the mixture under continuous stirring. The stirring was continued for another 8 hours while maintaining a temperature of 40° C., thus yielding a raw material liquid according to Example 8. An amount of 49.8 g of the raw material liquid according to Example 8, 44.6 g of 1-methoxy-2-propanol (solvent), and 2.2 g of an aqueous aluminum nitrate solution (prepared by dissolving aluminum nitrate nonahydrate (manufactured by KANTO CHEMICAL CO., INC., special grade) in deionized water and having a $(Al(NO_3)_3$ concentration of 28.4 mass %) were mixed by stirring, and 3.4 g of the fine titania particle dispersion as used in Example 1 was further added under stirring. A coating liquid according to Example 8 was thus obtained. The solids concentration of the coating liquid according to Example 8 was 6.46 mass %. The content of tetraethoxysilane (source of silica of the binder) calculated as $SiO_2$, the content of the fine silica particles, the content of the fine titania particles, and the content of the aluminum compound calculated as $Al_2O_3$ in solids of the coating liquid according to Example 8 were as shown in Table 1. The ratio among the content of tetraethoxysilane calculated as $SiO_2$, the content of the fine silica particles, and the content of the fine titania particles in the coating liquid according to Example 8 was equal to the ratio among the the content of tetraethoxysilane calculated as $SiO_2$, the content of the fine silica particles, and the content of the fine titania particles in the coating liquids according to Examples 5 and 6. Example 8 was different from Examples 5 and 6 in that, for the preparation of the coating liquid according to Example 8, phosphoric acid was used as the hydrolysis catalyst instead of hydrochloric acid and that the coating liquid according to Example 8 contained an aluminum compound. A low-reflection coated glass sheet according to Example 8 was fabricated in the same manner as in Example 1, except for using the coating liquid according to Example 8 instead of the coating liquid according to Example 1.

Comparative Example 1

A coating liquid according to Comparative Example 1 was prepared in the same manner as in Example 1, except for adjusting the amounts of the materials so that the content of tetraethoxysilane (source of silica of the binder) calculated as $SiO_2$, the content of the fine silica particles, and the content of the aluminum compound calculated as $Al_2O_3$ in solids of the coating liquid according to Comparative Example 1 were as shown in Table 1. Specifically, in preparing the coating liquid according to Comparative Example 1 from the raw material liquid, any fine titania particle dispersion was not added and, instead, 1.66 g of an aqueous aluminum chloride solution (prepared by dissolving reagent-grade aluminum chloride hexahydrate in deionized water and having an $AlCl_3$ concentration of 47.6 mass %) was added and mixed by stirring with the other materials The solids concentration of the coating liquid according to Comparative Example 1 was 7.35 mass %. A low-reflection coated glass sheet according to Comparative Example 1 was fabricated in the same manner as in Example 1, except for using the coating liquid according to Comparative Example 1 instead of the coating liquid according to Example 1.

Comparative Example 2 and Comparative Example 3

Coating liquids according to Comparative Example 2 and Comparative Example 3 were prepared in the same manner as in Example 1, except for adjusting the amounts of the materials so that the content of tetraethoxysilane (source of silica of the binder) calculated as $SiO_2$, the content of the fine silica particles, and the content of the fine titania particles in solids of the coating liquids were as shown in Table 1. The solids concentration of each of the coating liquids according to Comparative Example 2 and Comparative Example 3 was 4 mass %. Low-reflection coated glass sheets according to Comparative Example 2 and Comparative Example 3 were fabricated in the same manner as in Example 1, except for using the coating liquids according to Comparative Example 2 and Comparative Example 3 instead of the coating liquid according to Example 1.

As shown in Table 1, the transmittance gain was 1.7% or more for the low-reflection coated glass sheets according to Examples (in fact, the transmittance gains was 1.8% or more and, in Examples 1 to 6 and 8, was 2.0% or more). This demonstrated that the low-reflection coated glass sheets according to Examples permit transmission of a larger amount of light than the glass sheets unprovided with any low-reflection coating. The reflectance loss after reciprocating abrasion test was 1.0% or more for the low-reflection coated glass sheets according to Examples, which proved that the low-reflection coated glass sheets according to Examples had high abrasion resistance. The water contact angle after ultraviolet irradiation was 5° or less for the low-reflection coated glass sheets according to Examples, which proved that the fine titania particles exhibited good photocatalytic function in the low-reflection coated glass sheets according to Examples.

The water contact angle after ultraviolet irradiation was much greater than 5° for the low-reflection coated glass sheet according to Comparative Example 1, which is attributed to the fact that the low-reflection coated glass sheet contained no fine titania particles. That is, the low-reflection coated glass sheet according to Comparative Example 1 did not exhibit photocatalytic function. In the low-reflection coated glass sheets according to Comparative Example 2 and Comparative Example 3, the content of the silica of the binder was less than 25 mass % based on the total mass of the low-reflection coating. This is why the low-reflection coated glass sheets according to Comparative Example 2 and Comparative Example 3 had low abrasion resistance, which was demonstrated by the fact that the reflectance loss after the reciprocating abrasion test was much lower than 1.0%. As for the low-reflection coated glass sheets according to Examples 5, 6, and 8 among which the ratio among the content of tetraethoxysilane calculated as $SiO_2$, the content of the fine silica particles, and the content of the fine titania particles was the same, the reflectance loss after the reciprocating abrasion test was 1.3% or more for the low-reflection coated glass sheets according to Examples 6 and 8 in which the coating liquid did not contain propylene glycol. That is, the low-reflection coated glass sheets according to Examples 6 and 8 had higher abrasion resistance than the low-reflection coated glass sheet according to Example 5. Propylene glycol is a high-boiling-point solvent having a boiling point of 187° C. and requires more energy when evaporated and removed from the applied coating liquid during drying and curing of the applied coating liquid than 1-methoxy-2-propanol (boiling point: 121° C.). This leads to a loss of the energy to be spent in polycondensation reaction among silanol groups in the binder component contained in the applied coating liquid, silanol groups in the surfaces of the fine silica particles, and silanol groups in the surface of the glass substrate. Thus, when the coating liquid is free of propylene glycol, an adequate amount of energy is spent in the above polycondensation reaction during the curing step, so that the polycondensation reaction is promoted. In consequence, strong bonds can be formed in the low-reflection coating. This is thought to explain why the low-reflection coated glass sheets according to Examples 6 and 8 had higher abrasion resistance. Furthermore, given that the low-reflection coated glass sheet according to Example 8 contained an aluminum compound and phosphoric acid which was present as a hydrolysis catalyst in the raw material liquid of the coating liquid, the chemical resistance such as water resistance or alkali resistance of the low-reflection coating of the low-reflection coated glass sheet according to Example 8 is expected to have been improved.

TABLE 1

| | Contents of components in low-reflection coating [mass %] | | | | Average thickness of low-reflection coating [nm] | Transmittance gain [%] | Reflectance loss [%] | | Contact angle after 24-hour ultraviolet irradiation [°] |
| --- | --- | --- | --- | --- | --- | --- | --- | --- | --- |
| | Silica derived from binder source | Aluminum compound calculated as $Al_2O_3$ | Fine silica particles | Fine titania particles | | | Before reciprocating abrasion test | After reciprocating abrasion test | |
| Example 1 | 30 | 0 | 55 | 15 | 150 | 2.32 | 3.68 | 2.03 | 2.6 |
| Example 2 | 28 | 0 | 57 | 15 | 150 | 2.30 | 3.72 | 1.95 | |
| Example 3 | 30 | 0 | 58 | 12 | 150 | 2.33 | 3.79 | 1.72 | 3.3 |
| Example 4 | 30 | 0 | 53 | 17 | 150 | 2.21 | 3.76 | 1.66 | 1.8 |
| Example 5 | 28 | 0 | 55 | 17 | 150 | 2.40 | 3.76 | 1.04 | 1.9 |
| Example 6 | 28 | 0 | 55 | 17 | 160 | 2.08 | 2.30 | 1.50 | 2.6 |
| Example 7 | 40 | 0 | 43 | 17 | 160 | 1.8 | 2.19 | 1.01 | 5 |
| Example 8 | 26.7 | 4.8 | 52.4 | 16.2 | 160 | 2.0 | 2.32 | 1.33 | 4.8 |
| Comparative Example 1 | 33.3 | 4.8 | 61.9 | 0 | 140 | — | — | 1.55 | 22.3 |
| Comparative Example 2 | 10 | 0 | 73 | 17 | 150 | — | — | 0.56 | — |
| Comparative Example 3 | 20 | 0 | 63 | 17 | 150 | — | — | 0.54 | — |

The invention claimed is:

1. A low-reflection coated glass sheet comprising:
a glass sheet; and
a low-reflection coating formed on at least a portion of one principal surface of the glass sheet, the low-reflection coating containing a binder containing silica as a main component, fine silica particles bound by the binder, and fine titania particles bound by the binder, wherein
a transmittance gain is 1.7% or more, the transmittance gain being determined by subtracting an average light transmittance of the glass sheet unprovided with the low-reflection coating in the wavelength of 380 nm to 850 nm from an average light transmittance of the low-reflection coated glass sheet in the wavelength range of 380 nm to 850 nm, and
the low-reflection coating contains 25 mass % to 43 mass % of the silica of the binder, 40 mass % to 64 mass % of the fine silica particles, and 10 mass % to 20 mass % of the fine titania particles, based on the total mass of the low-reflection coating.

2. The low-reflection coated glass sheet according to claim 1, wherein
the transmittance gain is 2.0% or more, and
the low-reflection coating contains 26 mass % to 33 mass % of the silica of the binder, 47 mass % to 64 mass % of the fine silica particles, and 10 mass % to 20 mass % of the fine titania particles, based on the total mass of the low-reflection coating.

3. The low-reflection coated glass sheet according to claim 1, wherein the low-reflection coating contains 28 mass % to 30 mass % of the silica of the binder and 48 mass % to 58 mass % of the fine silica particles, based on the total mass of the low-reflection coating.

4. The low-reflection coated glass sheet according to claim 1, wherein a reflectance loss is 1.0% or more, the reflectance loss being determined by subtracting an average light reflectance of the low-reflection coated glass sheet in the wavelength range of 360 nm to 740 nm from an average light reflectance of the glass sheet unprovided with the low-reflection coating in the wavelength range of 360 nm to 740 nm, the average light reflectance of the low-reflection coated glass sheet being determined after the low-reflection coated glass sheet is subjected to a reciprocating abrasion test performed by moving an abrasive, CS-10F, in contact with the low-reflection coating at a load of 4 N with 50 cycles of reciprocation.

5. The low-reflection coated glass sheet according to claim 1, wherein a contact angle of a water droplet on the low-reflection coating is 5 ° or less, the contact angle being determined after the low-refection coating is irradiated with ultraviolet light having a wavelength of 352 nm and an energy density of 1 mW/cm$^2$ for 24 hours.

6. A coating liquid for forming a low-reflection coating of a low-reflection coated substrate,
wherein
the low-reflection coating is formed on at least a portion of one principal surface of a substrate and contains a binder containing silica as a main component, fine silica particles bound by the binder, and fine titania particles bound by the binder,
a transmittance gain is 1.7% or more, the transmittance gain being determined by subtracting an average light transmittance of the substrate unprovided with the low-reflection coating in the wavelength of 380 nm to 850 nm from an average light transmittance of the low-reflection coated substrate in the wavelength range of 380 nm to 850 nm, and
the low-reflection coating contains 25 mass % to 43 mass % of the silica of the binder, 40 mass % to 64 mass % of the fine silica particles, and 10 mass % to 20 mass % of the fine titania particles, based on the total mass of the low-reflection coating,
the coating liquid comprises fine silica particles, fine titania particles, a starting material of the binder, and a solvent,
the starting material of the binder comprises a silicon alkoxide, and
the solvent comprises an organic solvent as a main component, the organic solvent being miscible with water and having a boiling point of 150° C. or lower.

7. The coating liquid according to claim 6, further comprising an acid as a catalyst for hydrolysis of the silicon alkoxide, the acid having an acid dissociation constant pKa of 2.5 or less.

8. A method for producing a low-reflection coated substrate,
wherein
the low-reflection coated substrate includes: a substrate; and a low-reflection coating formed on at least a portion of one principal surface of the substrate, the low-reflection coating containing a binder containing silica as a main component, fine silica particles bound by the binder, and fine titania particles bound by the binder,
a transmittance gain is 1.7% or more, the transmittance gain being determined by subtracting an average light transmittance of the substrate unprovided with the low-reflection coating in the wavelength of 380 nm to 850 nm from an average light transmittance of the low-reflection coated substrate in the wavelength range of 380 nm to 850 nm, and
the low-reflection coating contains 25 mass % to 43 mass % of the silica of the binder, 40 mass % to 64 mass % of the fine silica particles, and 10 mass % to 20 mass % of the fine titania particles, based on the total mass of the low-reflection coating,
the method comprising: forming a coating film substrate; by applying a coating liquid to the substrate; and forming the low-reflection coating by drying and curing the coating film, wherein a surface of the substrate has a maximum temperature of 120 ° C. or higher and 350 ° C. or lower in the drying and curing of the coating film.

9. The method according to claim 8, wherein, in the drying and curing of the coating film, a duration during which the surface of the substrate has a temperature of 200° C. or higher is 5 minutes or less.

10. The method according to claim 8, wherein, in the drying and curing of the coating film, a duration during which the surface of the substrate has a temperature of 120° C. or higher is 3 minutes or less.

11. The method according to claim 8, wherein
the coating liquid comprising fine silica particles, fine titania particles, a starting material of the binder, and a solvent,
the starting material of the binder comprising a silicon alkoxide,and
the solvent comprising an organic solvent as a main component, the organic solvent being miscible with water and having a boiling point of 150° C. or lower.

* * * * *